United States Patent [19]

Piorr et al.

[11] Patent Number: 4,600,523

[45] Date of Patent: Jul. 15, 1986

[54] HYDROXYALKYL POLYETHYLENE GLYCOL ETHER FOAM INHIBITORS

[75] Inventors: Robert Piorr, Ratingen; Hans-Joachim Schluessler, Haan; Peter Nikolaus, Hilden, all of Fed. Rep. of Germany

[73] Assignee: Henkel Kommanditgesellschaft auf Aktien, Duesseldorf, Fed. Rep. of Germany

[21] Appl. No.: 681,766

[22] Filed: Dec. 13, 1984

[30] Foreign Application Priority Data

Dec. 15, 1983 [DE] Fed. Rep. of Germany ....... 3345349

[51] Int. Cl.⁴ .................................................. C11D 1/72
[52] U.S. Cl. ................................ 252/174.22; 252/135; 252/174.21; 252/321; 252/358; 252/DIG. 1; 568/622
[58] Field of Search ....................... 252/174.21, 174.22, 252/DIG. 1, 321, 358; 568/618, 622

[56] References Cited

U.S. PATENT DOCUMENTS

| 3,081,354 | 3/1963 | Gaertner et al. | 252/174.21 |
| 3,240,819 | 3/1966 | Gaertner et al. | 252/174.21 |
| 3,242,200 | 3/1966 | Johnson | 568/622 |
| 3,463,737 | 8/1969 | Kasperl et al. | 252/153 |
| 3,491,029 | 1/1970 | Kasperl et al. | 252/156 |
| 3,696,057 | 10/1972 | Schussler et al. | 252/544 |
| 3,829,506 | 8/1974 | Schmolka | 252/321 |
| 3,829,508 | 8/1974 | Diery et al. | 252/174.21 |
| 4,088,598 | 5/1978 | Williams | 252/135 |
| 4,312,768 | 1/1982 | Nassry et al. | 252/32.7 |
| 4,364,777 | 12/1982 | Grünert et al. | 134/29 |
| 4,375,565 | 3/1983 | Greif et al. | 568/622 |

FOREIGN PATENT DOCUMENTS

| 0088039 | 9/1983 | European Pat. Off. . |
| 1621593 | 7/1970 | Fed. Rep. of Germany . |
| 1621592 | 5/1971 | Fed. Rep. of Germany . |

*Primary Examiner*—Prince E. Willis
*Attorney, Agent, or Firm*—Ernest G. Szoke; Henry E. Millson, Jr.; Mark A. Greenfield

[57] ABSTRACT

An additive for cleaning preparations comprising a foam-inhibitive effective amount of a compound of the formula

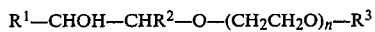

$$R^1-CHOH-CHR^2-O-(CH_2CH_2O)_n-R^3$$

wherein:

$R^1$ is a straight-chain $C_{6-16}$-alkyl;
$R^2$ is H or a $C_{1-8}$-alkyl;
$R^3$ is a straight-chain or branched $C_{4-8}$-alkyl; and
n is a number average of about 7 to 12;

with the proviso that the total number of carbon atoms in $R^1$ and $R^2$ is between 6 and 16; and a method of inhibiting foam.

13 Claims, No Drawings

HYDROXYALKYL POLYETHYLENE GLYCOL ETHER FOAM INHIBITORS

BACKGROUND OF THE INVENTION

1. Field of the Invention

This invention relates to terminal group blocked hydroxyalkyl polyethylene glycol ethers used as foam inhibitors in detergent compositions.

2. Statement of the Related Art

Aqueous industrial detergents used for cleaning metal, glass, ceramic and plastic surfaces, generally contain additives to counteract undesirable foaming. Foam is formed when using such detergents, by impurities which detach from the cleaned substrate and accumulate in the cleaning bath. Additionally, using foam inhibitors may be necessitated by the detergent compositions themselves, which may contain anionic or nonionic surfactants that foam under certain working conditions or temperatures.

Adducts of alkylene oxides with organic compounds containing—preferably several—reactive hydrogen atoms in the molecule have long been used successfully as foam inhibitive additives. Adducts that have proven to be particularly effective include: propylene oxide with aliphatic polyols (see U.S. Pat. No. 3,491,029 and corresponding German Application No. 12 80 455, as well as British Pat. No. 1,172,135 and corresponding German Application No. 16 21 592); propylene oxide with aliphatic polyamines (see U.S. Pat. Nos. 3,463,737, 3,491,029 and corresponding German Application No. 12 89 597, as well as British Pat. No. 1,172,134 and corresponding German Application No. 16 21 593); and ethylene oxide and propylene oxide with aliphatic diamines, particularly ethylene diamine (see U.S. Pat. No. 3,696,057 and corresponding German Application No. 19 44 569). In addition to a favorable foam-inhibitive effect, alkylene oxide adducts such as the foregoing also exhibit the stability to alkalis generally required for use in commercial and industrial detergents. However, the foregoing compounds are not sufficiently biodegradable to satisfy the current legislative requirements in Germany and in many other countries.

DESCRIPTION OF THE INVENTION

This invention affords foam inhibiting substances whose performance properties are at least equivalent to those already known in the art, and which have the additional property of improved biodegradability. The inventive foam inhibitors may be generally described as adducts of ethylene oxide with relatively long chain aliphatic alcohols or vicinal glycols, whose terminal groups are alkyl-blocked.

More specifically, the present invention relates to foam inhibitor additives for cleaning preparations in the nature of at least one hydroxyalkyl polyethylene glycol ether of the formula:

$$R^1-CHOH-CHR^2-O-(CH_2CH_2O)_n-R^3 \quad (I)$$

wherein:
$R^1$ is a straight-chain $C_{6-16}$-alkyl;
$R^2$ is H or a $C_{1-8}$-alkyl;
$R^3$ is a straight-chain or branched $C_{4-8}$-alkyl; and
n is a number average of about 7 to 12;
with the proviso that the total number of carbon atoms in $R^1$ and $R^2$ is between 6 and 16.

Other than in the operating examples, or where otherwise indicated, all numbers expressing quantities of ingredients or reaction conditions used herein are to be understood as modified in all instances by the term "about".

Suitable starting materials for producing the polyglycol ethers corresponding to formula I include linear or branched $C_{4-8}$ alcohols, such as n-butanol, i-butanol, n-amyl alcohol, i-amyl alcohol, n-hexanol, isomeric hexanols, n-heptanol and isomeric n-heptanols, n-octanol and isomeric octanols, such as 2-ethylhexanol. These alcohols, which may be used either individually or in admixture, are reacted with ethylene oxide in known manner in a molar ratio of from 1:7 to 1:12.

The reaction products obtained are reacted with $C_{8-18}$-epoxides, preferably in the presence of suitable alkaline catalysts. Both 1,2-epoxides and also compounds containing an internal epoxide group may be used for the reaction. $C_{12-16}$-1,2-epoxides have proven to be particularly suitable. Mixtures of epoxides of different chain lengths are also suitable. The molar ratio of alkyl polyglycol ether to epoxide preferably is 1:1 and the addition of alkaline catalyst is between 0.1 to 1% by weight, based on the quantity of epoxide used. The reaction is carried out by heating for several hours to temperatures of 100° to 200° C., preferably 120° to 180° C. The conversion level may readily be determined by determining the epoxide content of the mixture. Heating for 4 to 8 hours to 150°–170° C. is generally sufficient.

Further information on the reaction of polyglycol ethers with long chain epoxides can be found in European Published Patent Application No. 88,039.

In preferred embodiments of the invention, referring to formula I, $R^1$ is a linear $C_{12-16}$-hydrocarbon, $R^2$ is hydrogen, $R^3$ is n-butyl, n-hexyl, or n-octyl, and n is a number from 8 to 10. It is particularly preferred to use compounds of formula I in which $R^3$ is an n-butyl radical.

The polyglycol ethers corresponding to formula I may be used either individually or in a mixture thereof, or in further combination with at least one secondary foam-inhibitive compound which is a polyethylene glycol ether of the type obtainable by the addition of from 4 to 20 parts of ethylene oxide onto 1 part by weight of polyglycerol having a hydroxyl number of from 900 to 1200, followed by etherification of the free hydroxyl groups with at least one alkyl halide containing from 4 to 8 carbon atoms, as described in German Patent Application No. 33 15 952 (and corresponding U.S. application No. 06/601,477, now U.S. Pat. No. 4,522,740 which is incorporated herein by reference). Mixtures of the polyglycol ethers of formula I and the terminal group blocked polyglycerol polyglycol ethers defined above in a ratio by weight of 1–9:1, preferably 2.3–9:1, have a particularly pronounced foam inhibiting effect.

The terminal group blocked hydroxyalkyl polyglycol ethers of formula I used in accordance with the invention are distinguished by their high stability to alkalis and acids, by their very effective inhibition of foaming in mildly acidic to strongly alkaline cleaning solutions and by favorable degradation rates in the waste water. Their biodegradability, as determined by the prescribed methods, is equivalent to a BiAS-removal of more than 80%.

The cleaning preparations in which the terminal group blocked polyglycol ethers are used in accordance with the invention may contain the constituents normally present in preparations of this type, such as wetting agents, builders and complexing agents, alkalis or acids, corrosion inhibitors and, if desired, even antimicrobial agents and/or organic solvents. Suitable wetting agents are nonionics, such as polyglycol ethers of the type obtained by the addition of ethylene oxide onto alcohols, particularly fatty alcohols, alkyl phenols, fatty amines and carboxylic acid amides, and anionics, such as alkali metal, amine and alkylol amine salts of fatty acids, alkyl sulfuric acids, alkyl sulfonic acids and alkyl benzene sulfonic acids. The builders and complexing agents which the cleaning preparations may contain include alkali metal orthophosphates, polymer phosphates, silicates, borates, carbonates, polyacrylates and gluconates and also citric acid, nitriloacetic acid, ethylene diamine tetraacetic acid, 1-hydroxyalkane-1,1-diphosphonic acids, amino tri-(methylene-phosphonic acid) and ethylene diamine tetra-(methylene-phosphonic acid), phosphonoalkane polycarboxylic acids such as, for example, phosphonobutane tricarboxylic acid, and alkali metal salts of these acids. Highly alkaline cleaning preparations, particularly those for washing bottles, contain considerable quantities of caustic alkali in the form of sodium and potassium hydroxide. If it is desired to obtain special cleaning effects, the cleaning agents may contain organic solvents, for example alcohols, petroleum fractions and chlorinated hydrocarbons, and free alkylol amines.

In the context of the invention, cleaning preparations are primarily understood to be the aqueous solutions intended for direct application to the substrates to be cleaned. In addition, the expression "cleaning preparations" also applies to the concentrates and solid mixtures intended for the preparation of the working solutions.

The solutions ready for use may be mildly acidic to strongly alkaline.

The hydroxyalkyl polyglycol ethers of formula I either alone or in admixture with the second compound when used in accordance with the invention are added to the ready-to-use cleaning preparations in a foam inhibitive amount, preferably in a concentration of 10 to 2500 ppm, most preferably 50 to 500 ppm.

EXAMPLES 1–8

Production of the Terminal Group Blocked Hydroxyalkyl Polyglycol Ethers

Example 1

484 g (1 mol) of the adduct of 10 mols of ethylene oxide with 1 mol of n-butanol, 227.5 g (1 mol) of linear 1,2-epoxy tetradecane and 1.3 g of sodium methylate (30% solution in methanol) were heated in vacuo to 100° C. to remove the methanol introduced with the catalyst and then heated with stirring for 6 hours to 160° C. in an inert gas atmosphere. After cooling, the reaction product was neutralized with the equivalent quantity of acetic acid and filtered.

The product had an analytically determined hydroxyl number of 80. Its cloud point, as determined in 1% sodium hydroxide, was below 5° C.

Examples 2–8:

The terminal group blocked hydroxyalkyl polyglycol ethers shown in Table I were similarly produced. Their cloud points were determined in 1% sodium hydroxide solution. E.O. stands for added ethylene oxide groups and the symbol < for "less than".

TABLE I

| Example No. | Starting materials | | OH number | Cloud point (°C.) |
|---|---|---|---|---|
| | Epoxide | Glycol ether | | |
| 1 | 1,2-epoxytetradecane | n-butanol + 10 E.O. | 80 | <5 |
| 2 | 1,2-epoxyoctane | n-butanol + 9 E.O. | 99.5 | 37 |
| 3 | 1,2-epoxydecane | n-butanol + 9 E.O. | 100 | 19 |
| 4 | 1,2-epoxydodecane | n-butanol + 9 E.O. | 101 | 17 |
| 5 | 1,2-epoxyhexadecane | n-butanol + 9 E.O. | 75.6 | <5 |
| 6 | 1,2-epoxyoctandecane | n-butanol + 9 E.O. | 70 | <5 |
| 7 | 1,2-epoxytetradecane | n-hexanol + 10 E.O. | 69.5 | <5 |
| 8 | 1,2-epoxydodecane | 2-ethylhexanol + 10 E.O. | 69 | <5 |

Production of the Terminal Group Blocked Polyglycerol Polyglycol Ethers in Accordance With German Patent Application No. 33 15 952

In an autoclave, 137 g of polyglycerol (hydroxyl number 961) were reacted with 1400 g of ethylene oxide (ratio by weight 1:10.9) at 180° C./10 bar in the presence of 3 g sodium methylate. 1313 g of polyglycerol ethylene glycol ether, hydroxyl number 113, were obtained.

350 g of the product obtained, 171 g of n-hexyl chloride and 228 g of 75% by weight sodium hydroxide solution were stirred for 4 hours at 120° C. The organic phase was separated off from the cooled reaction mixture. The organic phase was washed with water at 50° C. until the washing liquid showed a neutral reaction. Unreacted hexychloride and water were removed from the reaction mixture by heating in vacuo to 150° C. 281.5 g of polyglycerol polyethylene glycol hexylether (polyglycerol+10.9 butyl-E.O.) were obtained. The product had a hydroxyl number of 3.5. The reaction product is referred to hereinafter as product B.

Foam Inhibition Test

The foam inhibiting effect was determined using test solutions containing 1% by weight of sodium hydroxide and 0.03% by weight (300 ppm) of foam inhibitor. In the course of the tests, triethanolamine tetrapropylene benzene sulfonate was added to these solutions as the test foaming agent in quantities increasing in stages by amounts of 100 ppm.

Quantities of 200 ml of the test solutions were tested at 65° C. in the foam beating apparatus according to German Industrial Standard (DIN) 53,902. The foam volume in ml was read off at 5 seconds. An average value from 5 individual measurements was determined for each concentration of the test foam agent. From the results obtained, the foam volume observed at a concentration of the test foaming agent of 1200 ppm is shown in the second column of Table II below. As a second representative measured value, the concentration of test foaming agent at which a foam volume of more than 200 ml was measured for the first time is shown in the third column of Table II.

TABLE II

| Foam Inhibitor of Example No. | ml of foam at 1200 ppm of test foaming agent | ppm of test foaming agent for >200 ml of foam |
| --- | --- | --- |
| 2 | 300 | 600 |
| 3 | 300 | 1200 |
| 4 | 200 | 1600 |
| 1 | 30 | 2000 |
| 5 | 35 | 2200 |
| 6 | 40 | 1800 |
| 7 | 30 | 2000 |
| 8 | 30 | 1800 |

EXAMPLE 9

A storable, solid, bottle washing preparation was prepared by mechanically mixing the following components: 80 parts by weight of caustic soda, 12 parts by weight of sodium tripolyphosphate, 5 parts by weight of sodium silicate (molar ratio of $Na_2O$ to $SiO_2$ 1:3.35) and 3 parts by weight of the product of Example 1. Using a 1% by weight solution of this preparation, milk bottles were washed at 80° C. in a standard bottle washing machine having one solution zone and an hourly throughput of 18,000 bottles. The cleaning effect was good and no troublesome foaming was observed.

EXAMPLE 10

A storable, solid mixture was obtained by mechanically mixing the following active components: 80 parts by weight of sodium tripolyphosphate and 20 parts by weight of the product of Example 5. Beer bottles were washed at 85° C. in a bottle washing machine having three solution zones and an hourly throughput of 80,000 bottles. The beer bottles had been labeled with paper labels using casein glue which normally causes vigorous foaming in immersion baths. When 1.5% by weight sodium hydroxide solution containing 0.15% by weight of the active mixture described above was used for washing, the machine could be operated without any troublesome foaming.

EXAMPLE 11

A storable mixture was prepared by mechanically mixing the following active components: 40 parts by weight of sodium ethylene diamine tetraacetate, 20 parts by weight of sodium tripolyphosphate, 30 parts by weight of sodium gluconate, 10 parts by weight of the product of Example 1.

Wine bottles were washed at 85° C. in a standard commercial bottle washing machine having two separate solution zones and an hourly throughput of 24,000 bottles. A 1.5% by weight sodium hydroxide solution to which 0.5% by weight of the concentrate described above had been added was used as the cleaning solution. Washing was not accompanied by any troublesome foaming and the bottles were satisfactorily clean.

EXAMPLE 13

A storable cleaning preparation for cleaning metal surfaces by spraying was prepared by mechanically mixing the following components: 80 parts by weight of sodium metasilioate pentahydrate, 16 parts by weight of sodium tripolyphosphate, 4 parts by weight of cocoamine+12 E.O., 1 part by weight of the product of Example 1.

The foam formation and foam collapse of a 2% by weight solution of this cleaning agent was tested at 60° C. in accordance with German Industrial Standard (DIN) 53,902 by comparison with an agent which did not contain the product of Example 1, but which had otherwise the same composition. The results are set out in Table IV below.

TABLE IV

| Cleaning agent | ml. of foam after mins. | | | |
| --- | --- | --- | --- | --- |
|  | 0 | 1 | 2 | 10 |
| Comparison Example | 530 | 140 | 0 | 0 |
| Example 13 | 180 | 15 | 0 | 0 |

EXAMPLE 14

An immersion type degreasing agent for metals was prepared by mechanically mixing the following components: 40 parts by weight of sodium metasilicate pentahydrate, 35 parts by weight of sodium carbonate, 20 parts by weight of sodium tripolyphosphate, 2.5 parts by weight of sodium alkyl benzene sulfonate, 2.5 parts by weight of nonyl phenol+14 E.O., 4.5 parts by weight of the product of Example 1, 0.5 part by weight of product B.

Greasy steel moldings were cleaned at 60° C. by immersion in a 4% by weight solution of this cleaning preparation. The degreasing effect was very good and no troublesome foaming was observed.

EXAMPLE 15

A storable concentrate for cleaning metal surfaces was prepared by dissolving the following components in water: 30 parts by weight of sodium caprylate, 10 parts by weight of borax, 14 parts by weight of sodium tripolyphosphate, 10 parts by weight of triethanolamine, 2 parts by weight of monoethanolamine, 6 parts by weight of the product of Example 1, 78 parts by weight of water.

Iron surfaces were sprayed at 50° to 55° C. with a 1.5% by weight solution of this cleaning agent (pH 8.5). The cleaning effect was good and no troublesome foaming was observed.

EXAMPLE 16

A storable concentrate for cleaning metal surfaces was prepared by dissolving the following components in water: 25 parts by weight of the diethanolamine salt of isononanoic acid, 20 parts by weight of diethanolamine, 1 part by weight of benztriazole, 4 parts by weight of the product of Example 6 and 50 parts by weight of water.

Gray iron castings were sprayed at 50° to 55° C. with a 1% by weight solution of this cleaning preparation. The cleaning effect was good and no troublesome foaming was observed.

We claim:

1. A method of inhibiting foam in an aqueous cleaning preparation or a solid or liquid concentrate for preparation of the same, comprising incorporating therein a foam-inhibitive effective amount of at least one first compound of the formula

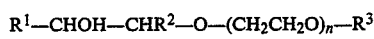

wherein:
  $R^1$ is a straight-chain $C_{6-16}$-alkyl;
  $R^2$ is H or a $C_{1-8}$-alkyl;
  $R^3$ is a straight-chain or branched $C_{4-8}$-alkyl; and
  n is a number average of about 7 to 12;

with the proviso that the total number of carbon atoms in $R^1$ and $R^2$ is between 6 and 16.

2. The method of claim 1 wherein at least one second compound is admixed with said at least one first compound in a weight ratio of about 1:1-9, said second compound being the reaction product of 1 part by weight of polyglycerol having a hydroxyl number of about 900 to 1,200 ethoxylated with about 4 to 20 parts by weight of ethylene oxide, whose free hydroxyl groups are then etherified with at least one $C_{4-8}$-alkyl halide.

3. The method of claim 1 wherein said first compound is present in a concentration of about 10 to 2,500 ppm in the ready-to-use cleaning preparation.

4. The method of claim 1 wherein said first compound is present in a concentration of about 50 to 500 ppm in the ready-to-use cleaning preparation.

5. The method of claim 1 wherein $R^1$ is $C_{12-16}$.

6. The method of claim 1 wherein $R^2$ is H.

7. The method of claim 1 wherein $R^3$ is n-butyl, n-hexyl, or n-octyl.

8. The method of claim 1 wherein n is a number average of about 8 to 10.

9. The method of claim 1 wherein $R^1$ is $C_{12-16}$, $R^2$ is H, and n is a number average of about 8 to 10.

10. The method of claim 9 wherein $R^3$ is n-butyl.

11. The method of claim 2 said admixture of said first compound and said second compound is present in a concentration of about 10 to 2,500 ppm in the ready-to-use cleaning preparation.

12. The method of claim 2 wherein said admixture of said first compound and said second compound is present in a concentration of about 50 to 500 ppm in the ready-to-use cleaning preparation.

13. The method of claim 2 wherein said weight ratio of said second compound to said first compound is about 1:2.3-9.

* * * * *